United States Patent [19]
Kauppinen

[11] Patent Number: 6,075,598
[45] Date of Patent: *Jun. 13, 2000

[54] INTERFEROMETER

[76] Inventor: Jyrki Kauppinen, Kyypellontie 1, Fin-21350, Ilmarinen, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/809,816

[22] PCT Filed: Sep. 15, 1995

[86] PCT No.: PCT/FI95/00503

§ 371 Date: Mar. 31, 1997

§ 102(e) Date: Mar. 31, 1997

[87] PCT Pub. No.: WO96/11387

PCT Pub. Date: Apr. 18, 1996

[30] Foreign Application Priority Data

Oct. 10, 1994 [FI] Finland ..................................... 944741

[51] Int. Cl.[7] ...................................................... G01B 9/02
[52] U.S. Cl. ............................................ 356/346; 356/358
[58] Field of Search ...................................... 356/346, 358

[56] References Cited

U.S. PATENT DOCUMENTS

| 4,383,762 | 5/1983 | Burkert . |
| 5,150,172 | 9/1992 | Brierley . |
| 5,159,405 | 10/1992 | Ukon . |
| 5,457,529 | 10/1995 | Tank et al. ............................... 356/346 |
| 5,481,359 | 1/1996 | Barker ...................................... 356/352 |

FOREIGN PATENT DOCUMENTS

| 37 36 694 | 6/1989 | Germany . |
| 42 15 871 | 11/1993 | Germany . |

Primary Examiner—Robert H. Kim
Attorney, Agent, or Firm—Burns, Doane, Swecker & Mathis, L.L.P.

[57] ABSTRACT

The invention relates to an interferometer comprising a beamsplitter (10), a mirror (11) for retroreflecting beams (S1, S2), at least one pair of mirrors (12, 13) made up of two plane mirrors for reflecting the beams (S1, S2). The pair of mirrors (12, 13) is fitted in a rigid structure (15), which is arranged to rotate around an axis (A). It is characteristic that the beamsplitter (10) is attached to a body (20) supported on the mount and that the axis (A) passes through the body (20). According to a recommended embodiment, the retroreflecting mirror (11) is also attached to the body (20).

20 Claims, 12 Drawing Sheets

INTERFEROMETER

FIELD OF THE INVENTION

The invention relates to an improved Michelson-type interferometer.

BACKGROUND OF THE INVENTION

The simplest interferometer is a Michelson plane mirror interferometer presented schematically in FIG. 1. The main components of this interferometer are the beamsplitter, the fixed mirror and the movable mirror. A light beam hits the beamsplitter, whereupon part of it passes through and is reflected from the fixed mirror back to the beamsplitter and therefrom to the receiver, which may be e.g. a photocell or a human eye. Part of the light beam is reflected from the beamsplitter onto the movable mirror from which it is reflected back to the beamsplitter and further to the receiver. The beams incident on the receiver from the fixed mirror and the movable mirror interfere. If the distances of both mirrors to the beamsplitter are exactly equal, said distances include the same number of wavelengths of the used light. If the movable mirror is moved closer to or farther away from the beamsplitter in the way indicated by the arrow, the receiver can register interference maxima at a distance of half of the wavelength.

Interferometers are used e.g. for the measurement of distances with very high accuracy, for the mapping of unevenness of various surfaces, and for the determination of wavelength or wavelengths (spectra) of electromagnetic radiation.

Spectrometry is the widest application area of interferometers. In this application, it is important that the moving mirror is capable of being moved with high accuracy without tilting the mirror. The maximum allowable tilt angle must obey the equation $\beta < \lambda/8D$ where D is the diameter of the mirror and $\lambda$ is the wavelength. There have been attempts to solve the problem e.g. by employing cube corner mirrors as the fixed mirror and the moving mirror. Another possibility is to employ a so-called dynamic alignment system wherein either the moving or the fixed mirror is continuously adjusted to maintain the adjustments of the interferometer. However, a new problem arises from the application of cube corner mirrors i.e. their lateral movement. Furthermore, cube corner mirrors are expensive and they have insufficient accuracy especially in the UV range. The dynamic alignment system is very sensitive to disturbances caused by mechanical vibrations. Furthermore, the linear path is mechanically very sensitive to external disturbances which always contain components in the direction of the motion.

The Perkin Elmer Dynascan™ 2000 instrument, the structure of which is shown in FIG. 2, represents an improvement on the classical Michelson interferometer. The beamsplitter and the mirrors PP1 and PP2 reflecting the light beams back are placed immovable with respect to each other. The optical path difference of the beams from the beamsplitter is accomplished by means of two pairs of mirrors HP and HP' so that said pairs of mirrors are placed on a rigid mount which is rotatable around an axis marked with a + in the manner indicated by an arrow. The advantage with this so-called swinging interferometer is that the mirrors themselves need not be moved linearly with respect to the mount. The problem with this instrument is, however, the complicated structure and especially its large size which limits its use in spectrometers.

The U.S. Pat. No. 4,915,502 presents an improved swinging interferometer whose design is shown in FIG. 3. This interferometer differs, in principle, from the Perkin Elmer Dynascan™ 2000 instrument described above in that both beams S1 and S2 from the beamsplitter pass through the one and the same pair of mirrors HP. Thus the size of the instrument becomes smaller than in said Perkin Elmer solution. In this solution, the optical path difference can be lengthened by lengthening the "corridor" of the pair of mirrors thereby allowing both beams to pass several times between the pair of mirrors HP.

Though the solution described in the U.S. Pat. No. 4,915,502 represents an improvement on the prior art swinging interferometers, this instrument has obvious disadvantages. The main reason for the inaccuracy of an interferometer is the fact that due to pressure and temperature variations the mount deforms so that its one edge stretches or compresses more than the other or that the mount is subjected to torsion forces whereupon opposite sides of the mount twist in opposite directions. In the solution of said US patent the beamsplitter and the retroreflecting mirror assembly (consisting of two separate plane mirrors PP1 and PP2) which are both supported on the mount, are situated apart from each other. For this reason, even minute forces acting on the mount cause considerable measurement perturbations.

SUMMARY OF THE INVENTION

The objective of this invention is to remove the above problem and obtain an improved swinging interferometer with a compact and stable structure and a measuring accuracy that is independent of possible changes in the mount e.g. due to temperature.

BRIEF DESCRIPTION OF THE DRAWING FIGURES

FIG. 1 shows the structure of a classical Michelson interferometer representing the prior art, FIG. 2 shows the structure of the Perkin Elmer System 2000 Dynascan™ interferometer representing the prior art, FIG. 3 shows the structure of an improved swinging interferometer, representing the prior art, FIG. 4 shows the structure of an interferometer of the invention according to one embodiment, FIG. 5 shows a cross-sectional view of the interferometer of FIG. 4 in a vertical plane, FIG. 6 shows a detail of the axis, FIGS. 7–12 show different embodiments of the interferometer embodying the invention.

DETAILED DESCRIPTION OF THE INVENTION

Figure 1:
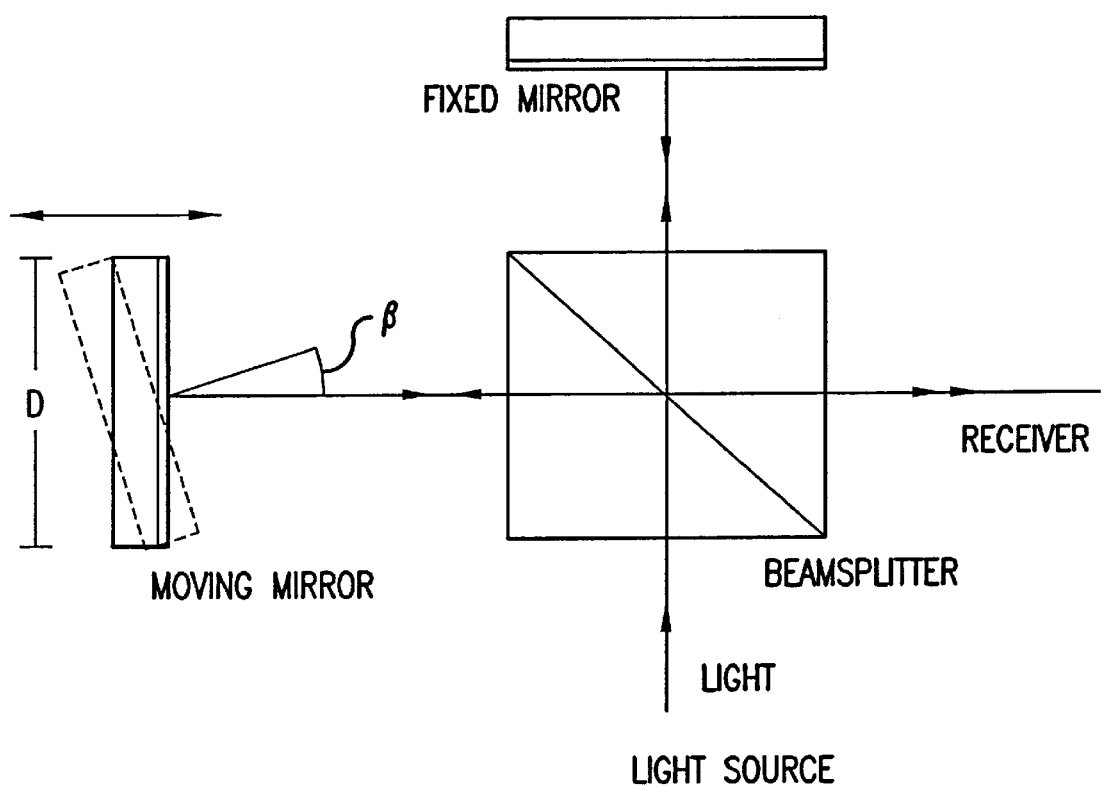
Figure 2:
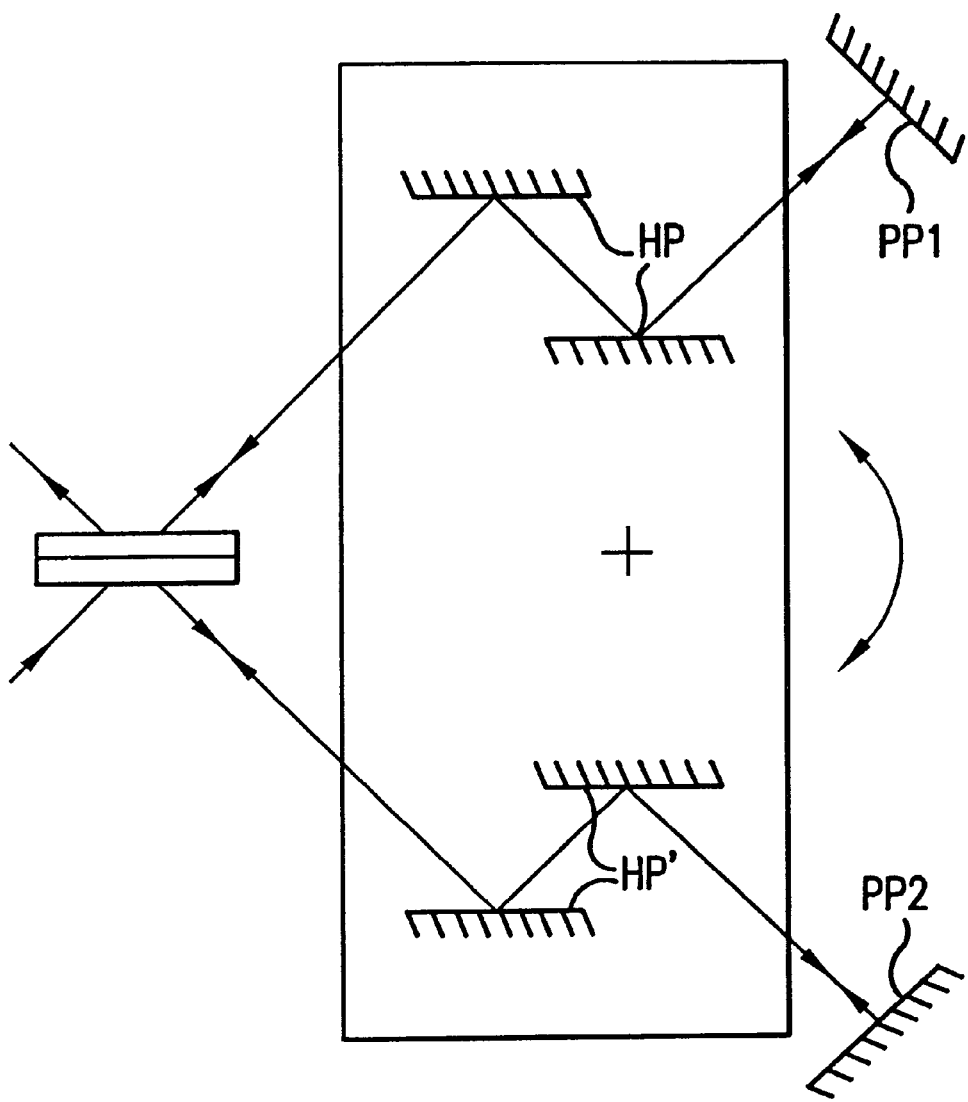
Figure 3:
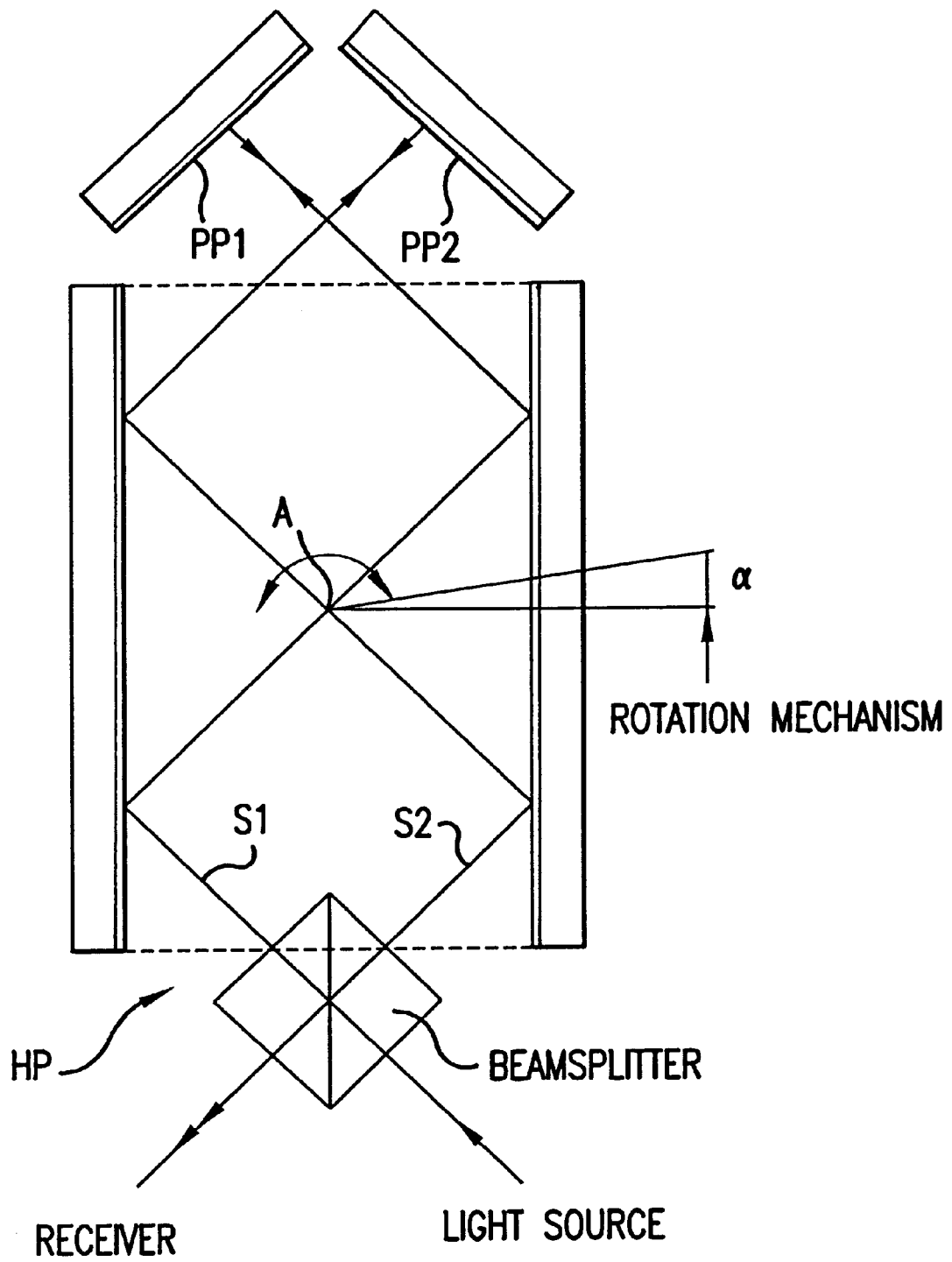
Figure 4:
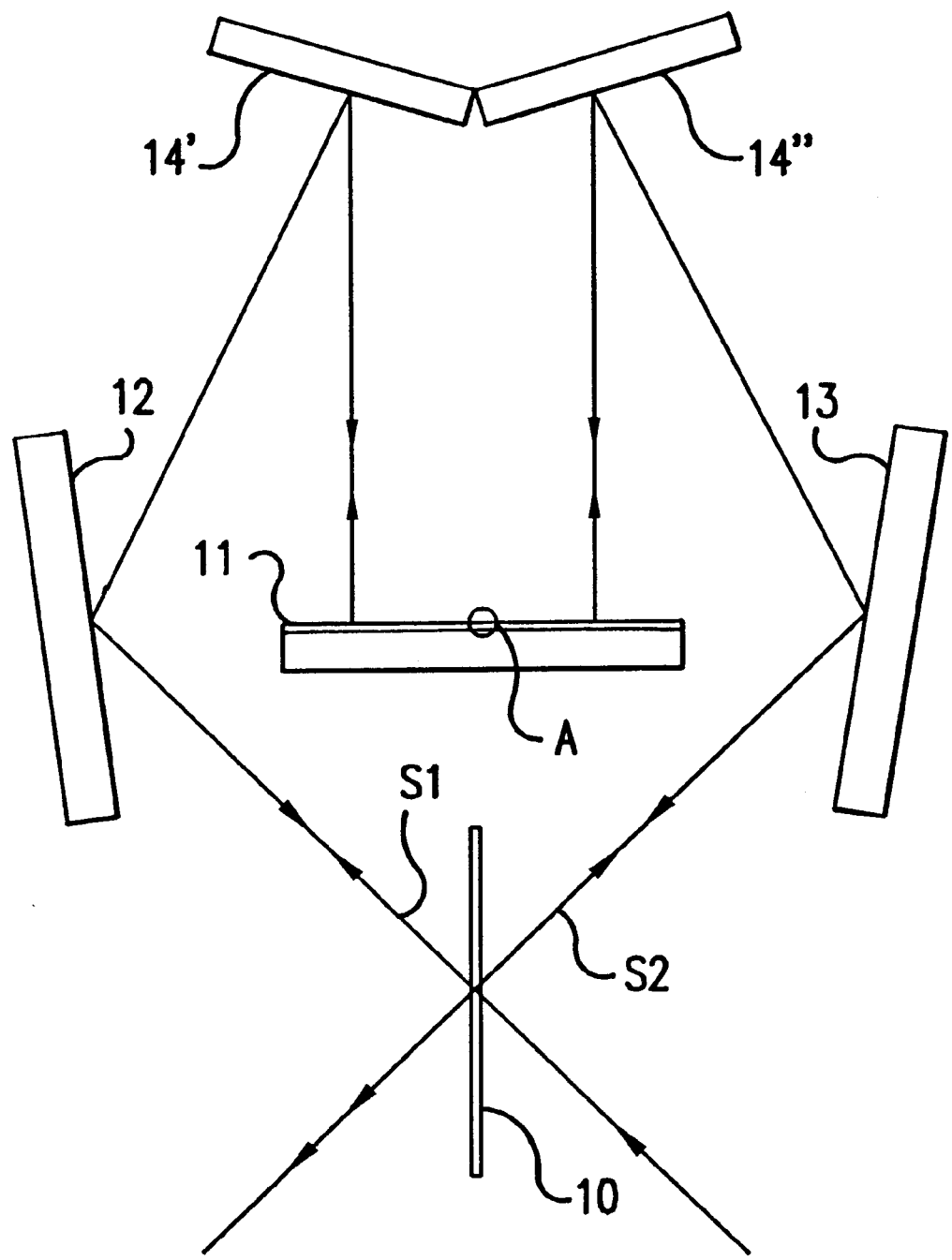

The interferometer of FIG. 4 comprises a beamsplitter 10, which divides the beam from the light source into two separate beams, in other words, S1 which has passed through the beamsplitter and S2 which has been reflected by the beamsplitter. The instrument further comprises one plane mirror 11 for retroreflecting the light beams S1, S2 and a pair of mirrors 12, 13 made up of two plane mirrors for reflecting beams S1, S2. The instrument further comprises a second pair of mirrors consisting of plane mirrors 14' and 14" disposed at an angle. The pairs of mirrors 12, 13 and 14', 14" are fitted in a rigid structure 15, arranged rotatable around an axis A. The beamsplitter is attached to a body 20 supported on the mount, the axis A passing through the body. The axis A may denote either a physical body or its extension. The structure shows more clearly in FIG. 5. The pairs of mirrors 12, 13, and 14', 14" are missing in FIG. 5. The beams S1 and S2 traverse via the pairs of mirrors 12, 13, and 14', 14" as indicated by the line back to the retroreflecting mirror from which the beams are reflected back to the beamsplitter along the same route. Since the retroreflecting mirror 11 is situated near the beamsplitter, it is also possible to attach the retroreflecting mirror 11 to the body 20. This solution makes it possible to accomplish a long optical path difference and, at the same time, a very stable structure wherein the possible deformations of the mount do not have any influence on the traversal of the beams from the beamsplitter to the retroreflecting mirror and back to the beamsplitter. If desired, the instrument may be provided with a rotating mechanism for achieving the rotational motion but alternatively the assembly of the pairs of mirrors can be rotated manually.

Figure 5:
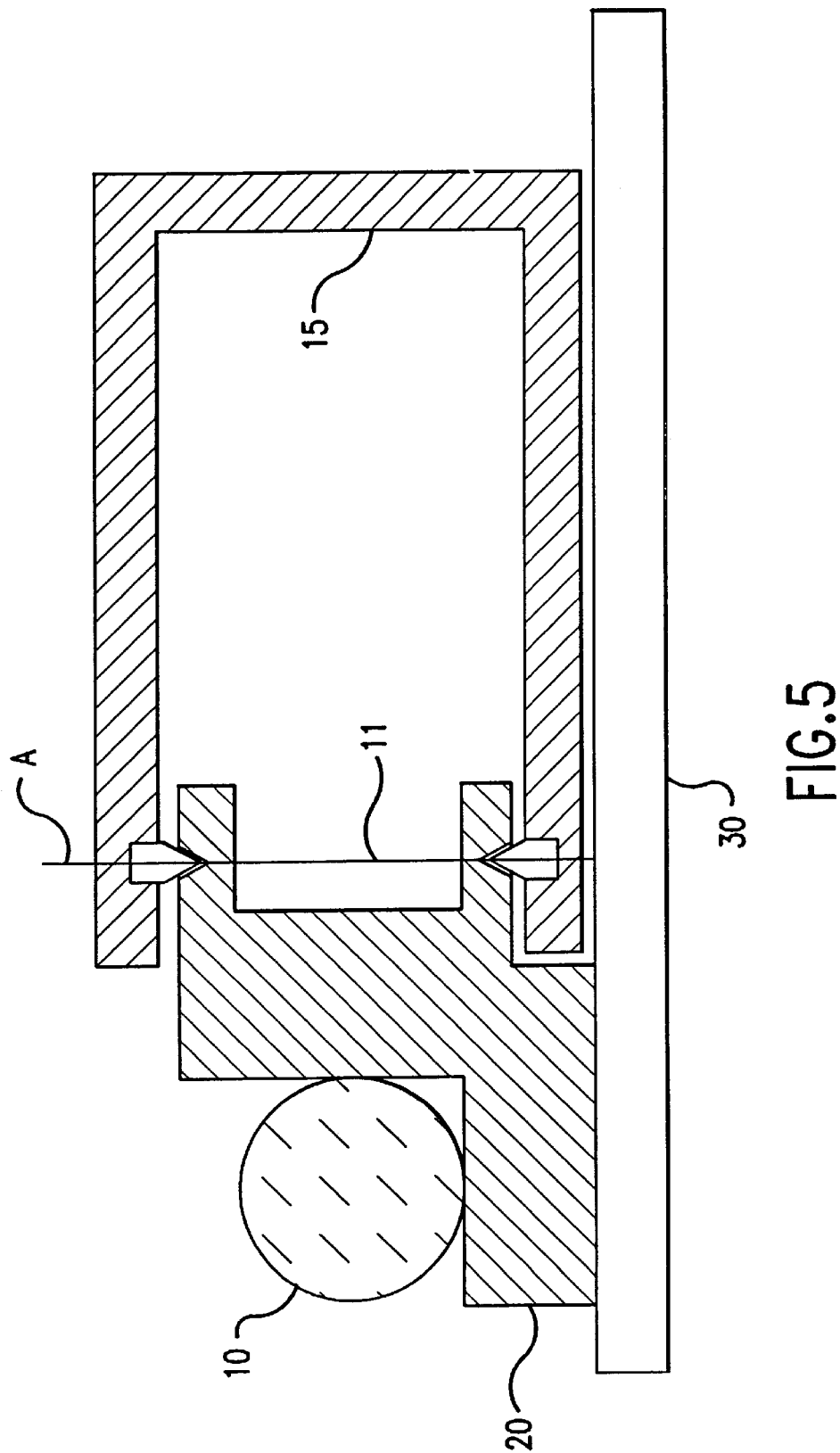

Changing of the optical path difference is accomplished by rotating the carousel 15 of the pairs of mirrors 12, 13 and 14', 14" around the axis A. Thus the optical path of the beam S1 lengthens while the optical path of the other beam S2 shortens. FIG. 5 shows that the beamsplitter 10 is attached to the body 20 which, in turn, is supported on the mount 30 of the interferometer. The retroreflecting mirror 11 is also attached to the body 20. The rigid structure 15 is a carousel to which the pairs of mirrors 12, 13 and 14', 14" (not shown in the figure) are attached. The rotation axis of the carousel passes through the body 20. Consequently, the possible deformation of the mount does not have any influence on the instrument operation. According to this solution, a separate mount is not necessarily needed for the interferometer but the interferometer may be directly attached to a mount of a larger assembly of instruments like e.g. a spectrometer.

Figure 6:
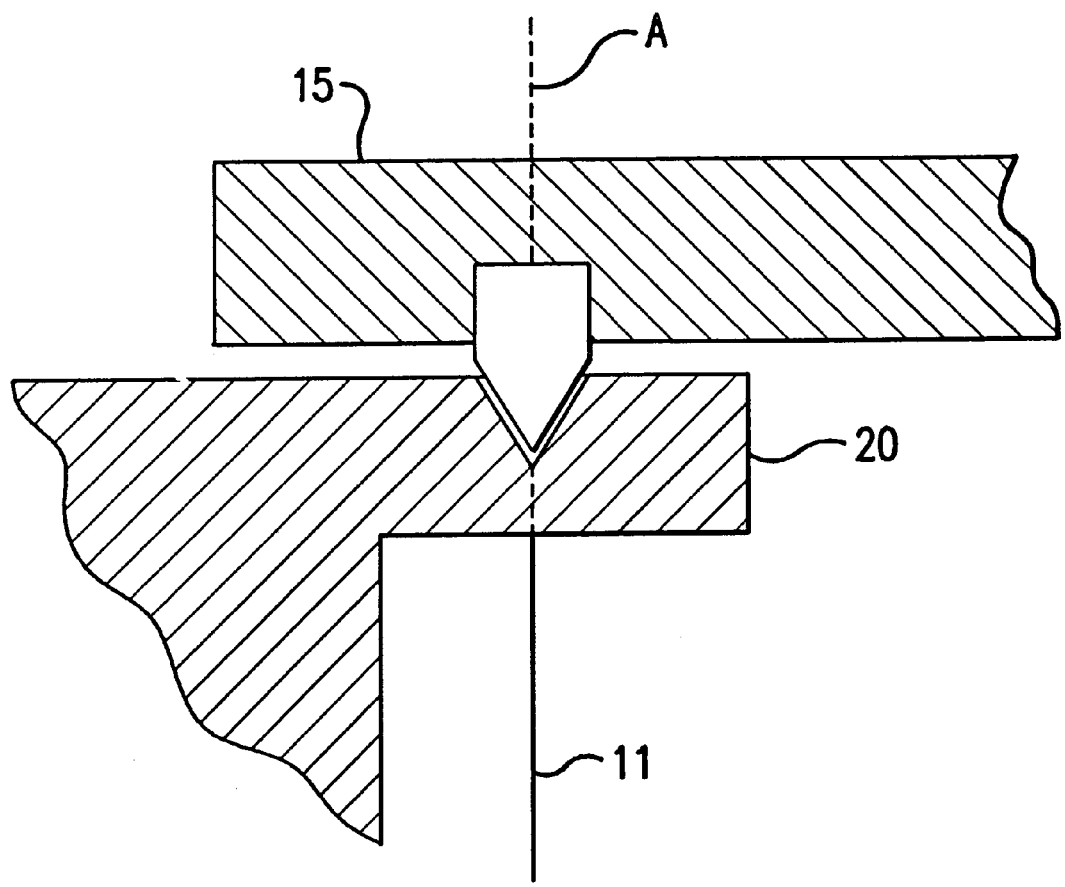

FIG. 6 presents a detail of the axis.

Figure 7:
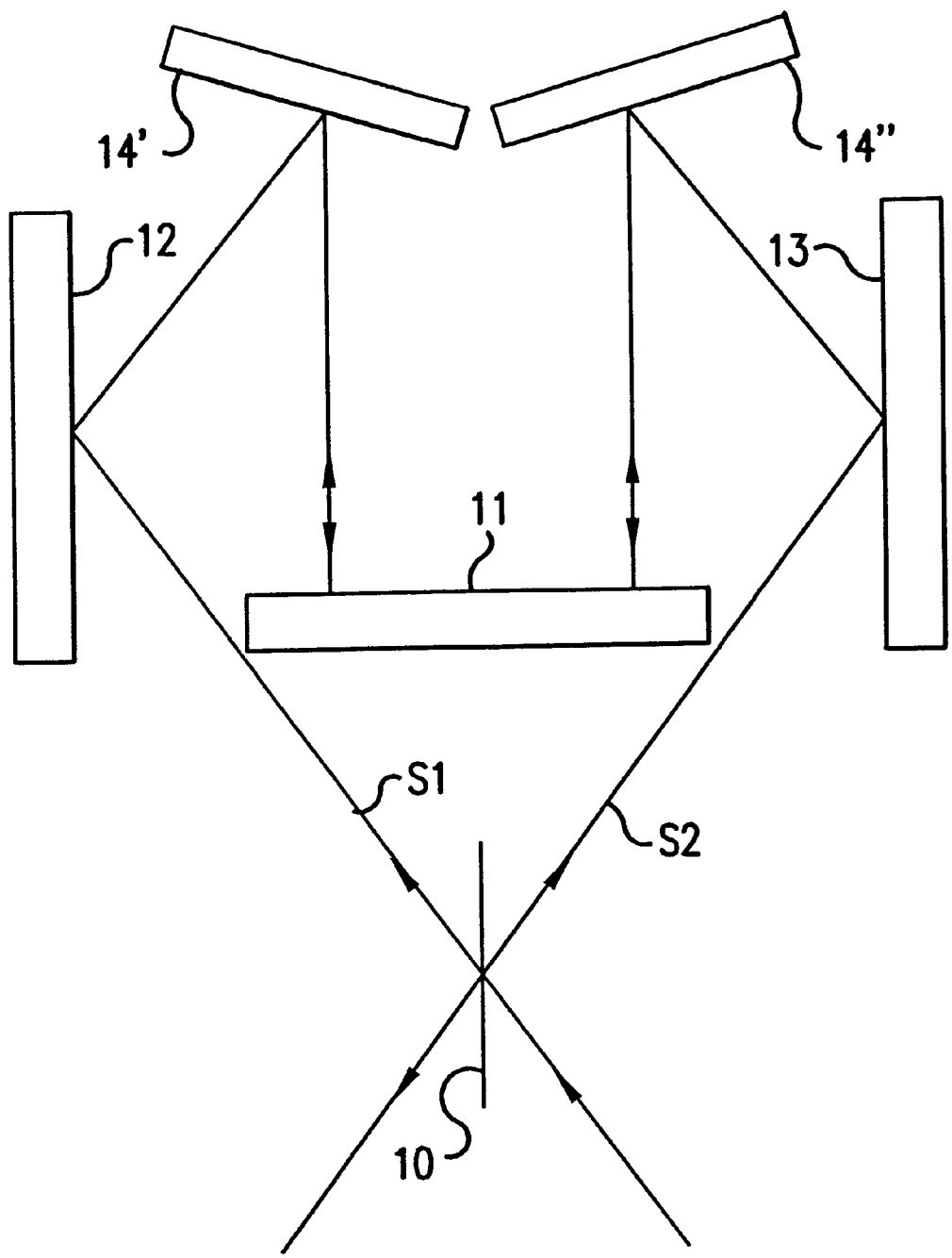
Figure 8:
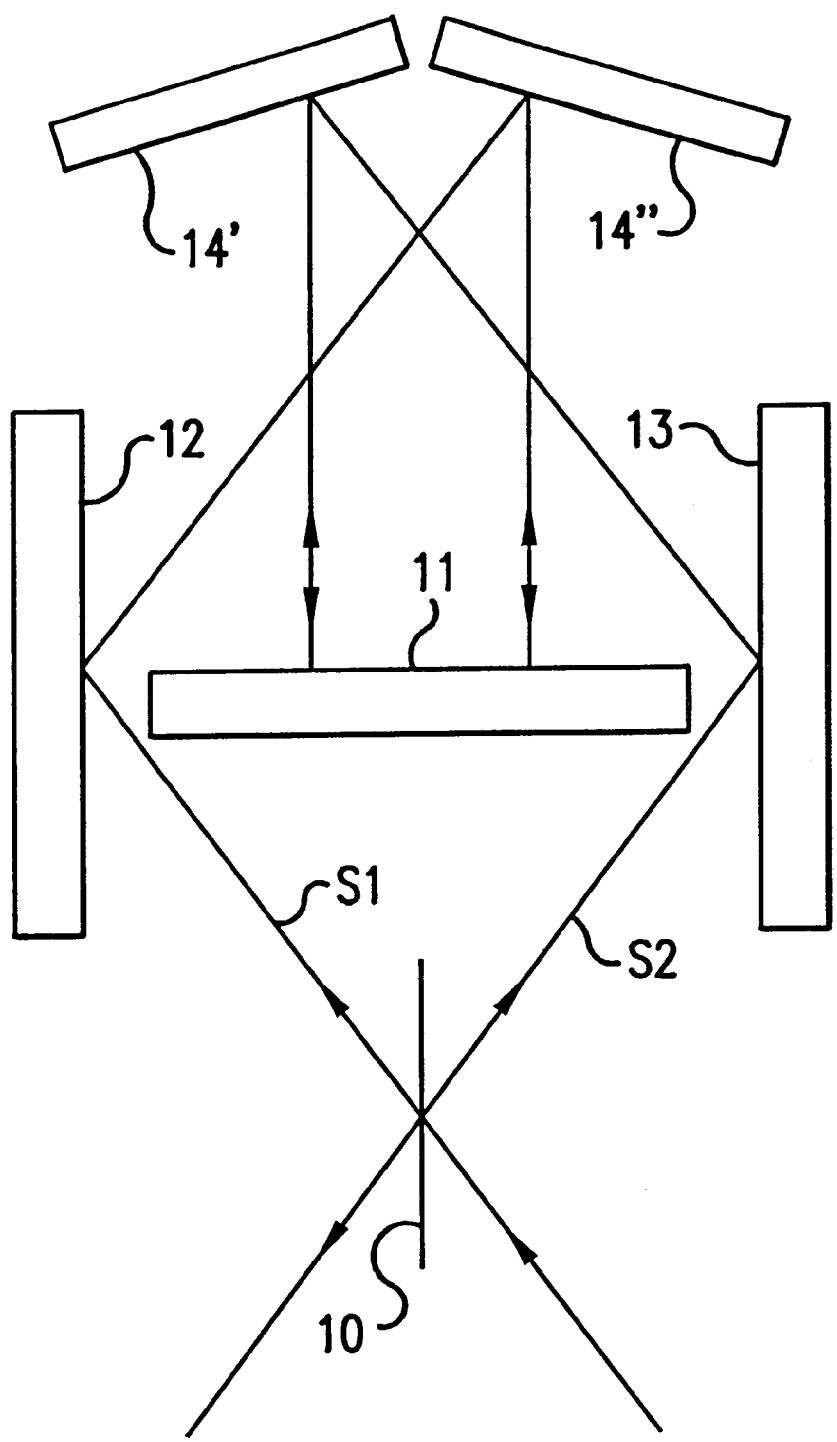

FIGS. 7 and 8 show variants of FIG. 4.

Figure 9:
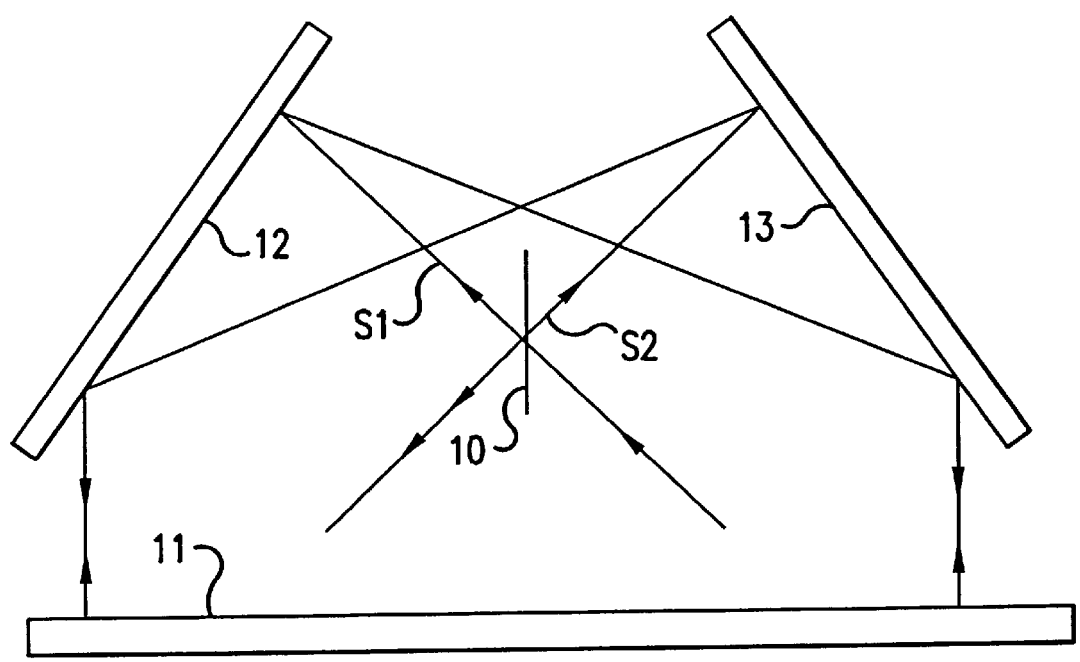

FIG. 9 shows a second embodiment of the invention. This has only a single rotating pair of mirrors 12, 13. The retroreflecting mirror 11 is situated on the opposite side of the beamsplitter with respect to the location of the paired mirrors 12, 13. In this solution it is also possible that the retroreflecting mirror 11 is attached to the same body 20 as the beamsplitter 10.

Figure 10:
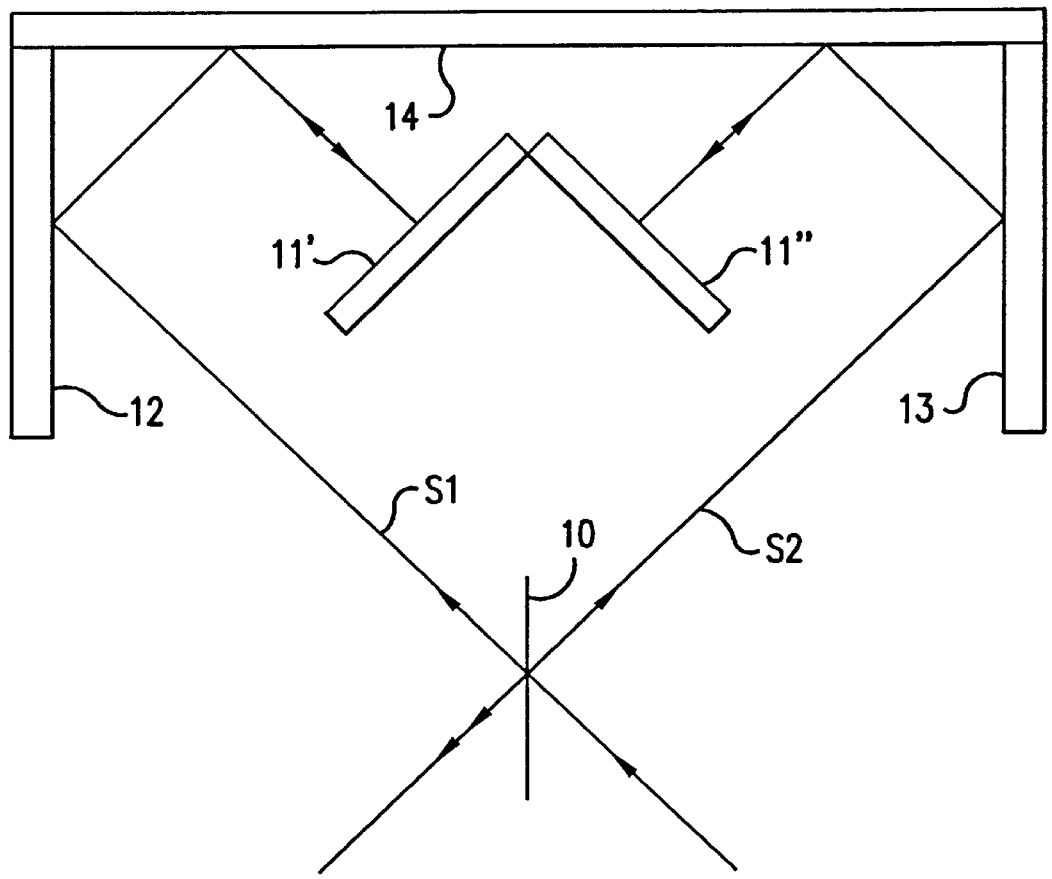

FIG. 10 shows a structure wherein the pair of mirrors 12, 13 is connected to mirror 14 so that the mirrors 12, 13, 14 form a uniform rotating structure with angles of 90 degrees between the mirrors. The retroreflecting mirror is made up of two plane mirrors 11', 11" whose reflecting surfaces make an angle of 270 degrees with each other. Also in this solution the retroreflecting mirror assembly 11', 11" may be attached to the same body 20 as the beamsplitter 10.

Figure 11:
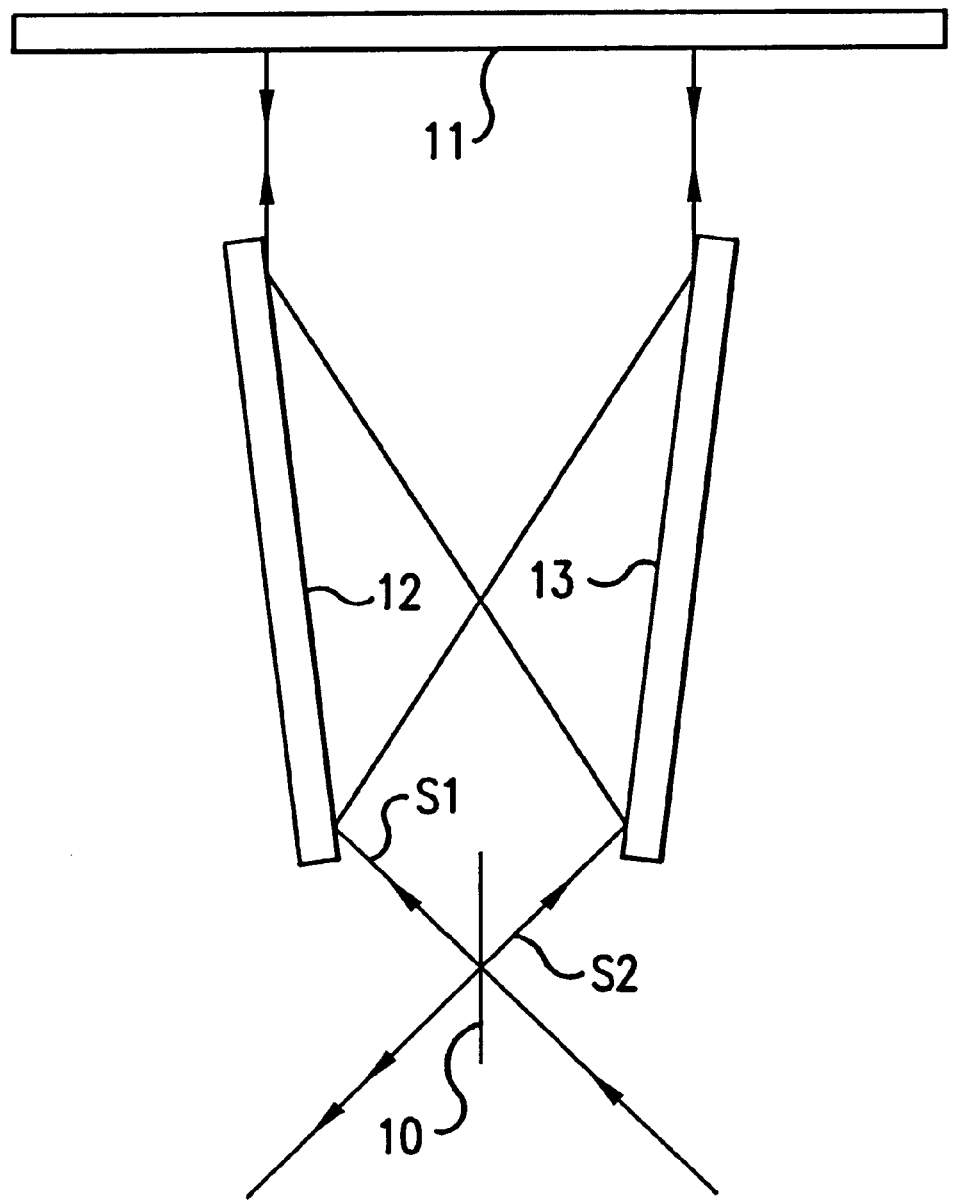
Figure 12:
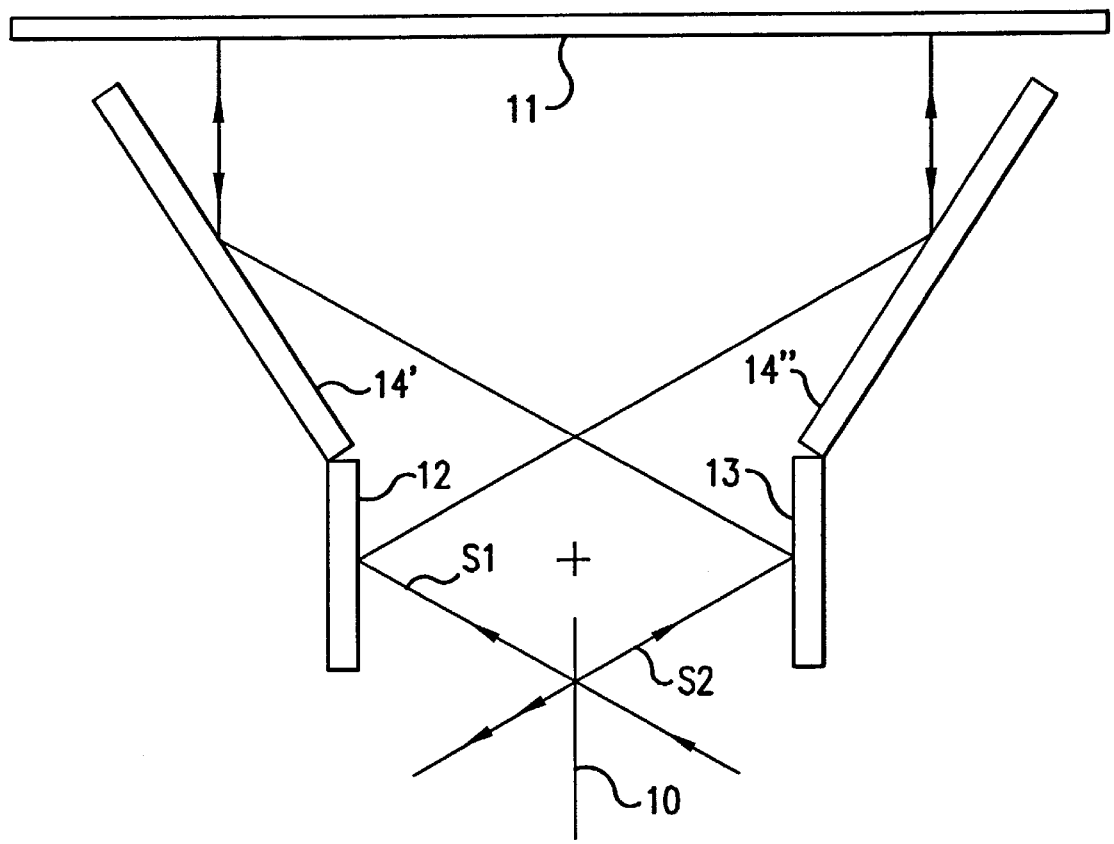

FIGS. 11 and 12 present yet another embodiment. In the solution of FIG. 11 the retroreflecting mirror 11 is situated at the opposite end of the corridor of the mirrors 12, 13 with respect to the beamsplitter 10 so that in this solution the beamsplitter 10 and the retroreflecting mirror 11 cannot be attached to the same body 20. However, a compact structure has been achieved because the rotating plane mirrors 12, 13 are not parallel. In the solution of FIG. 12, the instrument further comprises another pair of mirrors 14', 14" for lengthening the optical path difference. The plane mirrors 12, 13, 14', 14" are all connected to the same rigid structure 15.

It is common to all of the previous examples of FIGS. 4–12 that a considerably more compact and stable instrument construction has been accomplished with respect to the specific optical path difference compared to previously known swinging interferometers.

It is naturally possible to incorporate necessary additional components like light source and receiver in the interferometer.

The applied beam may be any electromagnetic beam from microwaves to UV-waves.

It is obvious to a specialist in the field that various embodiments of the invention may vary within the scope of the enclosed claims.

I claim:

1. Interferometer comprising a body supported on a mount, a beamsplitter attached to the body, a retroreflecting mirror for retroreflecting light beams, the retroreflecting mirror being attached to the body, at least one pair of mirrors for reflecting the light beams, the pair of mirrors being fitted in a rigid structure which is rotatably attached to the body so as to be rotatable around an axis that passes through the body, the at least one pair of mirrors, the beam splitter, and the retroreflecting mirror being located relative to each other such that light beams are reflected by the at least one pair of mirrors in a direction toward the beam splitter before the light beams have been retroreflected.

2. Interferometer according to claim 1, wherein the retroreflecting mirror is located in a plane perpendicular to a plane containing said beamsplitter.

3. Interferometer according to claim 1, wherein the retroreflecting mirror includes only one uniform plane mirror for retroreflecting two separate light beams.

4. Interferometer according to claim 1, wherein the at least one pair of mirrors includes another mirror attached to the rigid structure, said another mirror being a single plane mirror.

5. Interferometer according to claim 4, wherein the at least one pair of mirrors includes two pairs of mirrors.

6. Interferometer according to claim 1, wherein the at least one pair of mirrors includes only three mirrors.

7. Interferometer according to claim 1, wherein the at least one pair of mirrors includes four plane mirrors.

8. Interferometer according to claim 1, wherein the at least one pair of mirrors includes only two mirrors.

9. Interferometer according to claim 1, including a mechanism attached to the rigid structure for rotating the rigid structure, a light source for directing a light beam at the beamsplitter, and a receiver for receiving the light beam after being retroreflected off the retroreflecting mirror.

10. Interferometer according to claim 1, wherein the mount includes a longitudinal axis that is parallel with a plane passing through the beamsplitter, the axis that the rigid structure is rotatable around being substantially perpendicular to the longitudinal axis of the mount.

11. Interferometer according to claim 1, wherein the retroreflecting mirror is comprised of two plane mirrors forming an angle with one another.

12. Interferometer according to claim 11, wherein the two plane mirrors forming the retroreflecting mirror each have a reflecting surface, the reflecting surfaces of the two plane mirrors which form the retroreflecting mirror forming an angle of 270 degrees with one another.

13. Interferometer according to claim 1, wherein the axis passes through the retroreflecting mirror.

14. Interferometer comprising a body supported on a mount, at least two plane mirrors fitted in a rigid structure which is rotatably coupled to the body so as to be rotatable around an axis that passes through the body, a beamsplitter attached to the body for splitting a beam into two separate beams and directing each of the separate beams at one of the at least two plane mirrors, a retroreflecting mirror attached to the body for receiving beams directed along a beam path and for retroreflecting beams back along the beam path, the at least two plane mirrors, the beamsplitter, and the retroreflecting mirror being locate each other such that the separate beams are reflected in a direction toward the beam splitter before the separate beams have been retroreflected.

15. Interferometer according to claim 14, wherein the axis passes through the retroreflecting mirror.

16. Interferometer according to claim 14, wherein the interferometer includes only one retroreflecting mirror, the retroreflecting mirror being planar.

17. Interferometer according to claim 14, wherein the at least two plane mirrors include a third plane mirror.

18. Interferometer according to claim 14, wherein the at least two plane mirrors include four plane mirrors.

19. Interferometer according to claim 14, wherein the retroreflecting mirror is comprised of two plane mirrors forming an angle with one another.

20. Interferometer according to claim 14, wherein the mount includes a longitudinal axis that is parallel with a plane passing through the beamsplitter, the axis that the rigid structure is rotatable around being substantially perpendicular to the longitudinal axis of the mount.

* * * * *

UNITED STATES PATENT AND TRADEMARK OFFICE
CERTIFICATE OF CORRECTION

PATENT NO. : 6,075,598
DATED : June 13, 2000
INVENTOR(S) : Jyrki Kauppinen

It is certified that error appears in the above-identified patent and that said Letters Patent is hereby corrected as shown below:

Column 4,
Line 67, delete "locate" and insert therefor --located relative to--.

Signed and Sealed this

Nineteenth Day of June, 2001

*Attest:*

NICHOLAS P. GODICI
*Attesting Officer*  *Acting Director of the United States Patent and Trademark Office*